Nov. 25, 1941.        B. C. ROSS        2,263,931
VULCANIZED CREPE RUBBER
Filed July 1, 1940        2 Sheets-Sheet 1

INVENTOR.
Bryant C. Ross
BY
Pennie Davis Marvin & Edmonds
ATTORNEY.

Nov. 25, 1941.           B. C. ROSS              2,263,931
                    VULCANIZED CREPE RUBBER
                      Filed July 1, 1940          2 Sheets-Sheet 2

INVENTOR
Bryant C. Ross
BY
Pennie Davis Marvin Edmonds
ATTORNEYS

Patented Nov. 25, 1941

2,263,931

UNITED STATES PATENT OFFICE 2,263,931

VULCANIZED CREPE RUBBER

Bryant C. Ross, Palmyra, N. J., assignor to R. T. Vanderbilt Company, Incorporated, New York, N. Y., a corporation of New York Application July 1, 1940, Serial No. 343,425

6 Claims. (Cl. 18—53)

This invention relates to the manufacture of rubber products and more particularly to the production of vulcanized crepe surface rubber sheets. This application is a continuation in part of my copending application, Serial No. 254,887, filed February 6, 1939.

The use of unvulcanized crepe rubber in the manufacture of soles for tennis shoes and other sport shoes has been proposed and is now being used in considerable quantities. Although this material appeals to some users, it has the disadvantage that it has a tendency to spread and lose its shape along with the other well known disadvantages of unvulcanized rubber. Attempts to mill the rubber and compound it with other ingredients to permit vulcanization has heretofore been attended with the loss of the crepe surface.

The present invention is directed to a process and product whereby the desired crepe surface may be obtained and the undesired properties of unvulcanized rubber avoided. In carrying out the invention the raw rubber is compounded with an accelerator which is capable of bringing about vulcanization at atmospheric or only moderately elevated temperatures. The milled batch is then sheeted in the ordinary way and allowed to partially vulcanize with or without the aid of heat. The partially vulcanized stock is then creped by passing it between rolls operating at differential speed. The rolls do not carry any special pattern and are preferably smooth.

Vulcanization is carried out at a temperature between 25 and 100° C. using less than one part of sulphur to 100 parts pale crepe rubber. To this I add from .25 to 1 part of zinc oxide and a sufficient quantity of a highly active ultra-accelerator, such as mercaptobenzothiazole and dibutylammonium dibutyldithiocarbamate. The accelerators are used preferably in a total amount of less than 2 parts to 100 parts of rubber. The ingredients are mixed together on a mill, sheeted out to approximately the desired thickness, heated sufficiently to vulcanize the sheet to the desired degree and then passed through a mill to produce the desired crepe surface. In a specific example the following ingredients are used in substantially the following proportions:

| | |
|---|---|
| Pale crepe rubber | 100 |
| Zinc oxide | 0.5 |
| Sulphur | 0.25 |
| Mercaptobenzothiazole | 0.5 |
| Dibutylammonium dibutyldithiocarbamate | 1.0 |

In carrying out the invention, sulphur and zinc oxide in the desired proportions may be mixed in the form of master batches and the desired quantity of these materials are milled into the rubber in the usual way. After the addition of the zinc oxide and sulphur, the accelerators are then added and mixed with a minimum amount of milling to disperse them through the mix. The prepared bath is then removed from the mill in the form of a sheet of substantially the desired thickness. It is then partially vulcanized by heating it in an oven for about 90 minutes at a temperature of substantially 90° C. The time and temperature of the heating may be varied, longer periods of time being used for lower temperatures and shorter periods of time being employed for higher temperatures but the conditions are selected to produce substantially the equivalent of a period of 90 minutes and a temperature of 90° C. The partially vulcanized sheets are then passed through rolls operating at differential speed with the mill opening slightly less than the original thickness of the sheet to obtain the desired crepe surface. As stated, the provision of these rolls at differential speed produces the desired crepe surface without employing any special pattern on the rolls and I preferably employ smooth rolls. Partial vulcanization of the rubber before the creping operation with accelerators of the type disclosed permits vulcanization to continue to completion or to an optimum point after the creping.

In the accompanying drawings I have illustrated a sheet of rubber in which.

Figure 3:
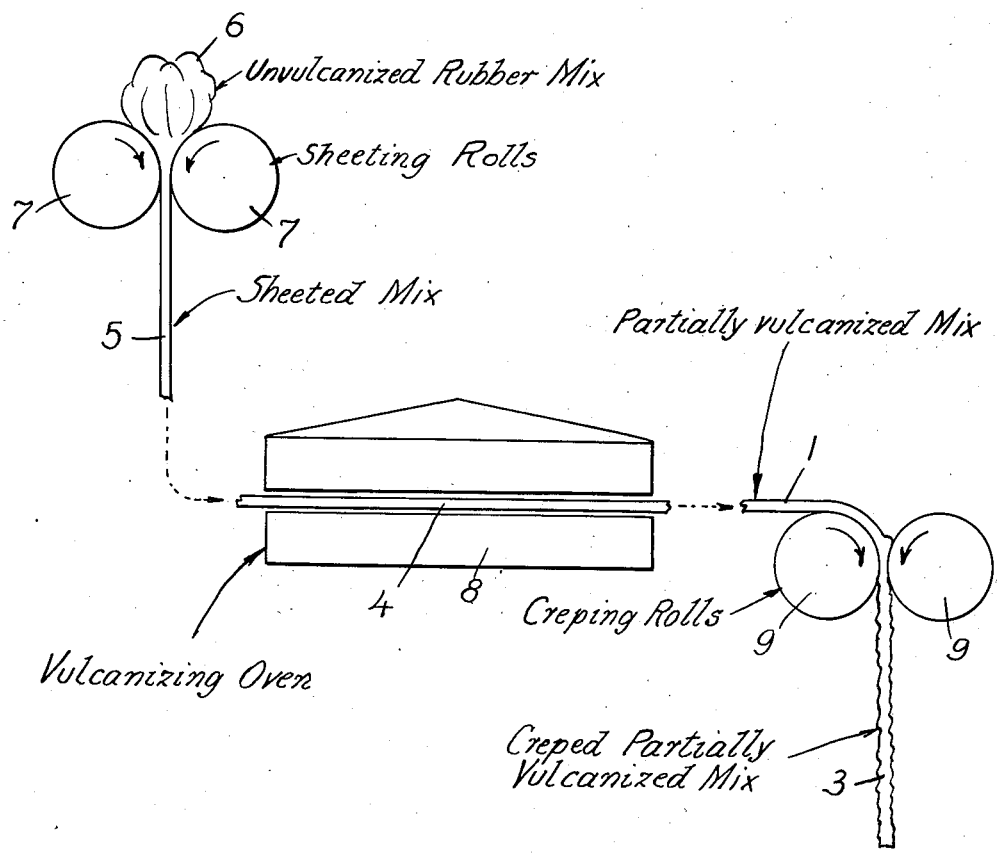

Fig. 3 diagrammatically illustrates the process of my invention.

Figure 1:
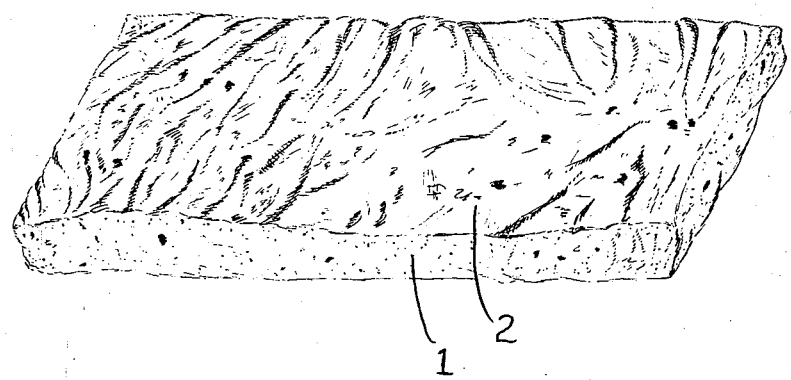
Fig. 1 illustrates the sheet prior to the creping operation.
Figure 2:
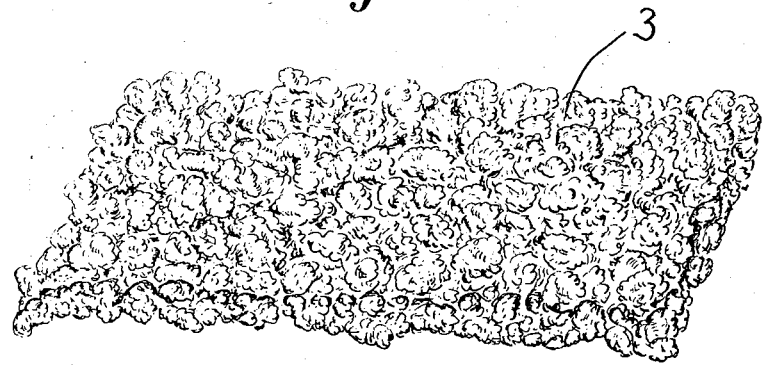
Fig. 2 illustrates the sheet after creping.

As shown in Fig. 1 a sheet 1 of rubber has a slightly irregular surface 2 prior to the creping operation. When this sheet is passed between rolls operating at differential speeds, the result is to produce the sheet shown in Fig. 2 in which the rubber is provided with the crepe surface illustrated.

As shown in Fig. 3: The milled batch 6, an unvulcanized mixture of raw rubber, sulfur, zinc oxide and an accelerator, is sheeted in the ordinary way between the rolls 7 to produce a sheeted stock 5. This sheeted stock 5 is then partially vulcanized, in the oven 8 for example, the sheet of stock undergoing vulcanization being designated 4, to produce a partially vulcanized stock 1 (also shown in Fig. 1). This partially vulcanized stock 1 is then passed between the rolls 9, operating at differential speeds, to produce the creped stock 3 (also shown in Fig. 2). This creped stock is the product of my invention.

While I have specifically disclosed the use of mercaptobenzothiazole and dibutylammonium dibutyldithiocarbamate as accelerators, other ultra-accelerators which are substantially equal in activity to these materials may be used. Also dyes, pigments and fillers may be added to the rubber without departing from the spirit of the invention. If more than one accelerator is used, they may be added separately or together and if desired they may be first dissolved in a suitable inert solvent.

The use of small quantities of sulphur and zinc oxide together with highly active ultra-accelerators and temperatures below 100° C. not only provides a product to which the desired crepe surface may be imparted but also produces a product in which the transparency of the original pale crepe rubber is not unduly decreased. This provides a product which has the appearance of the unvulcanized pale crepe rubber heretofore used in the manufacture of soles for tennis shoes and other sport shoes.

I claim:

1. A vulcanized rubber product having a crepe surface formed by sheeting an unvulcanized mixture of raw rubber, sulphur, zinc oxide and an accelerator, partially vulcanizing the sheet, and then passing the partially vulcanized sheet between differential speed rolls.

2. Vulcanized crepe rubber having a crepe surface and having substantially the transparency of unvulcanized pale crepe rubber.

3. The herein described process which comprises sheeting an unvulcanized mixture of raw rubber, sulphur, zinc oxide and an accelerator, partially vulcanizing the sheet, and then passing the partially vulcanized sheet between differential speed rolls.

4. The herein described process which comprises sheeting an unvulcanized mixture of rubber with less than 1 percent of sulphur, substantially .5 percent of zinc oxide, less than 2 percent of a highly active ultra accelerator, partially vulcanizing the sheet, and passing the partially vulcanized sheet between differential speed rolls.

5. The herein described process which comprises sheeting an unvulcanized mixture of rubber with less than 1 percent of sulphur, substantially .5 percent of zinc oxide, substantially .5 percent of mercaptobenzothiazole, and substantially 1 percent of dibutylammonium dibutyldithiocarbamate, partially vulcanizing the sheet and then passing the partially vulcanized sheet between differential speed rolls.

6. The herein described process which comprises sheeting substantially 100 parts of rubber, substantially .25 part of sulphur, substantially .5 part zinc oxide, substantially .5 percent mercaptobenzothiazole, substantially 1 part dibutylammonium dibutyldithiocarbamate, partially vulcanizing the sheet, and then passing the partially vulcanized sheet between differential speed rolls.

BRYANT C. ROSS.